2,783,274
METHOD OF MAKING SERINE

Halbert C. White and Don V. Wysong, Midland, Mich., assignors to The Dow Chemical Company, Midland, Mich., a corporation of Delaware No Drawing. Application November 9, 1953,
Serial No. 391,146

5 Claims. (Cl. 260—534)

This invention concerns a new and improved process for synthesizing serine and certain new compounds obtainable as intermediates in the process.

A number of methods for the synthesis of dl-serine are known; see Schmidt, Chemistry of the Amino Acids and Proteins, second edition, 1944, pages 90–92 and 1037; Wood et al., J. Biol. Chem. 134, 413–416 (1940); Mattox et al., ibid., 165, 501–503, (1946); Organic Synthesis, vol. 20, page 81; and U. S. Patent No. 2,530,065. However, all of the known methods involve one or more disadvantages, such as a procedure difficult to carry out, use of an expensive or difficulty obtainable starting material, or formation of the dl-serine in low yields, and are not well adapted to commercial practice.

It is an object of this invention to provide a simple direct process for the synthesis of dl-serine from inexpensive and readily available starting materials, which method permits production of dl-serine in good yields and in readily purifiable form. Another object is to provide certain new compounds which are obtainable as intermediates in the process. Further objects will be evident from the following description of the invention.

It has been found that dl-serine can be produced readily and in good yield by brominating acrylamide to form alpha,beta-dibromopropionamide; reacting the dibromopropionamide with a metal salt of a saturated lower monohydric aliphatic alcohol such as methanol, ethanol, propanol, or isopropanol, etc., whereby a corresponding alpha-bromo-beta-alkoxy-propionamide is formed; reacting the latter with ammonia, whereby an alpha-amino-beta-alkoxy-propionamide is formed; and hydrolyzing the alpha-amino-beta-alkoxy-propionamide by heating the same together with an aqueous solution of a hydrohalic acid such as hydrochloric acid, hydrobromic acid, or a mixture of hydrochloric and hydrobromic acids. The product thus formed is a hydrohalide of dl-serine. The dl-serine salt may be separated as the product or the mixture may be neutralized and dl-serine be separated therefrom in good yield. Each of these products can be obtained in a form of high purity.

The reactions involved in the above-stated combination of steps may be illustrated by the following equations:

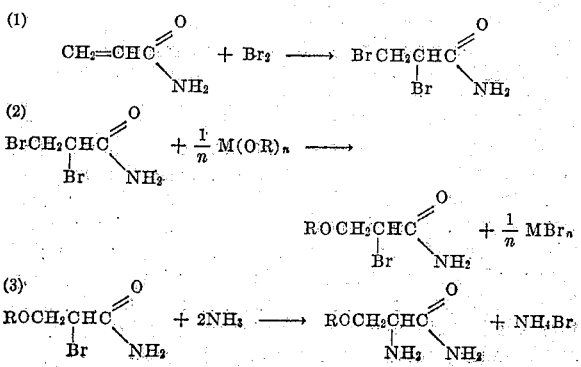

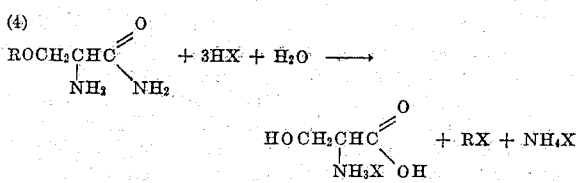

wherein M represents a metal, R represents a lower alkyl radical, $n$ represents the number of OR radicals chemically combined with the metal in the metal alkoxide starting material, and X represents a halogen atom, e. g. a chlorine or bromine atom.

The first of the above reactions is known in the art. It is not claimed, per se, but only in combination with other steps of the process. The alpha-amino-beta-alkoxy-propionamides obtainable by Reaction 3 are new chemical compounds. They may be separated as such or in the form of salts, e. g. hydrochlorides or hydrobromides, thereof. The free alpha-amino-beta-alkoxy-propionamides are usually liquids or solids of fairly low melting points, whereas the hydrochlorides and hydrobromides thereof are new crystalline compounds of higher melting points. Examples of such compounds are alpha-amino-beta-methoxy-propionamide, alpha-amino-beta-ethoxy-propionamide, alpha-amino-beta-propoxy-propionamide, and alpha-amino-beta-isopropoxy-propionamide, and the hydrochlorides and hydrobromides thereof, etc. The alpha-amino-beta-alkoxy-propionamides and their salts, are of value as intermediates for the synthesis of serine and may be sold for the production of dl-serine, or its hydrohalide, in accordance with the reaction of Equation 4.

Although the organic intermediate products indicated in the above Equations 1–3 can each be separated and purified prior to being employed in the successive reactions of the process, this is not necessary. The process can be started and carried to completion, without separation of the intermediate products, to obtain dl-serine, or a salt thereof, in good yield and readily purifiable form. When operating in this preferred manner, the reactions illustrated in Equations 1–4 represent successive steps, or stages, in a unified process.

The acrylamide, which is used as a starting material in the process, is commercially available in large quantities and at a moderate cost. The known reaction of the same with bromine to form alpha-beta-dibromo-propionamide is advantageously carried out by dissolving the acrylamide in an organic liquid that is inert to, or less reactive than acrylamide with, bromine and adding approximately its molecular equivalent of bromine to the solution. Methanol is a suitable solvent for use as the reaction medium, but other liquid organic solvents such as carbon tetrachloride, chloroform, 1,1,1-trichloroethane, or methylene chloride, etc., can be used. The reaction is usually carried out at temperatures between 20° and 70° C., but it can be accomplished at lower or higher temperatures. The bromine is usually added fairly rapidly to the acrylamide solution, after which the mixture is heated, e. g. to boiling under reflux, until the bromine is consumed. The bromination reaction is strongly exothermic.

The next stage of the process is that of reacting a metal alkoxide with the alpha,beta-dibromo-propionamide. This is usually accomplished by adding more than the stoichiometric amount, e. g. an at least 5 percent excess, of a metal alkoxide, or an alcoholic solution thereof, directly to the mixture in which the alpha,beta-dibromo-propionamide was formed, but the latter may first be isolated and be re-dissolved in a non-reactive liquid medium, if desired. Any of the aforementioned organic liquids suitable as media for the bromination reaction can be employed as media for the reaction between the dibromo-propionaldehyde and the metal alkoxide. However, it is desirable that an alcohol be present in amount sufficient to dissolve the metal alkoxide reactant. Examples of metal alkoxides that can be employed in the reaction are sodium methoxide, sodium ethoxide, sodium propoxide, sodium isopropoxide, potassium methoxide, potassium ethoxide, potassium propoxide, lithium methoxide, lithium ethoxide, magnesium methoxide, magnesium ethoxide, and aluminum ethoxide etc. It may be mentioned that the yields of dl-serine from the process are higher when the metal alkoxide is used in a moderate, e. g. a from 5 to 15 percent, excess over the stoichiometric amount than when it is used in smaller proportions and that it can be used in as large a proportion as desired. The excess of metal alkoxide is preferably neutralized by adding an acid such as formic, acetic, propionic or hydrochloric acid, etc., prior to carrying out the aforementioned ammonolysis reaction. Such neutralization is not necessary when using only a moderate excess, e. g. not more than a 15 percent excess, over the stoichiometric amount of the metal alkoxide reactant and operating on a laboratory scale, but becomes more advantageous with increase in the excess of metal alkoxide employed or with increase in the batch size of the reaction mixture.

The reaction between the metal alkoxide and the alpha, beta-dibromopropionamide is advantageously carried out, or at least completed, at temperatures between 0° and 40° C. and preferably between 10° and 30° C. The reaction can be started at lower temperatures, e. g. as low as −10° C., and temperatures up to 50° C. or higher can be tolerated for brief periods prior to completion of the reaction. However, the yield, or ease of recovery of crystalline dl-serine from the reaction mixture ultimately formed in the process, decreases when the temperature for completion of the reaction between the metal alkoxide and the dibromopropionamide is varied away from the preferred range of from 10° to 30° C.

The time required for the reaction is dependent on the kind of metal alkoxide employed. The reaction between sodium methoxide and alpha,beta-dibromopropionamide to form alpha-bromo-beta-methoxy-propionamide can be carried out in from 2 to 5 hours at temperatures in the preferred range of from 10° to 30° C. Any unreacted metal alkoxide remaining in the mixture is preferably neutralized, e. g. by adding an acid, prior to employing the product in the next stage of the process. However, such neutralization is not required. Although the alpha-bromo-beta-alkoxy-propionamide can be separated and purified prior to further employment in the process, this is not necessary. When an organic liquid other than an alcohol, e. g. carbon tetrachloride, has been used as a medium for either of the aforementioned reactions, it is preferably removed, e. g. by separating the alpha-bromo-beta-alkoxy-propionamide before using it in the next step of the process. However, when the foregoing reactions have been carried out in the presence of an alcohol as the reaction medium, the crude reaction mixture in which the alpha-bromo-beta-alkoxy-propionamide is formed is preferably treated directly in the next stage of the process.

A molecular excess of ammonia, e. g. at least 5 and preferably from 15 to 30 molecular equivalents or more of ammonia per mole of the alpha-bromo-beta-alkoxy-propionamide, is added to the latter or to the reaction mixture in which it is formed. The ammonia is preferably in substantially anhydrous form, but an aqueous ammonia solution of any desired concentration can be used. The mixture reacts slowly at room temperature to form an alpha-amino-beta-alkoxy-propionamide and is preferably heated, e. g. to temperatures of from 70° to 150° C. or higher, and preferably between 90 and 130° C., at the autogenous pressure or above in a bomb or autoclave, so as to accomplish the reaction in a short time. When using anhydrous ammonia in the above stated preferred proportions, the reaction can be carried out in from 3 to 4 hours or thereabout at reaction temperatures of from 90° to 100° C. and in from 0.5 to 1 hour at reaction temperatures of from 120° to 130° C. After completion of the reaction, the pressure is released and the mixture is evaporated, preferably under vacuum, substantially to dryness. The residual crude alpha-amino-beta-alkoxy-propionamide can be purified by crystallization as a hydrohalide thereof, or in other usual ways, but is usually employed directly for formation of dl-serine or a salt thereof.

The alpha-amino-beta-alkoxy-propionamide (either crude or purified) is hydrolyzed by heating the same together with an aqueous solution of hydrochloric acid, hydrobromic acid, or both. The concentration of the aqueous hydrohalic acid can be varied widely, e. g. aqueous hydrohalic acid solutions of 5-molar concentration or higher can be employed. The aqueous acid is preferably used in amount sufficient to dissolve the alpha-amino-beta-alkoxy-propionamide and contains at least three, and preferably five or more, molecular equivalents of the hydrohalic acid per mole of the alpha-amino-beta-alkoxy-propionamide. The hydrolysis is accomplished by heating the mixture to a reaction temperature, e. g. of 80° C. or higher and preferably between 100° and 150° C., at atmospheric or superatmospheric pressure. The mixture is usually heated to boiling under reflux until the hydrolysis is substantially complete.

The dl-serine, or its hydrohalide, can be separated from the hydrolysis mixture in any of the usual ways, e. g. by evaporting the mixture to concentrate the same and crystallizing the product therefrom. It is conveniently recovered by evaporating the mixture, preferably under vacuum, substantially to dryness and treating the residue with a lower aliphatic alcohol such as methanol or ethanol to dissolve the product. The mixture is filtered to remove undissolved inorganic material (principally an ammonium halide). The filtrate may be brought to a pH of from 7 to 8, e. g. by treatment with ammonia, and the di-serine be crystallized and separated therefrom. The product is usually obtained directly in a form of 95 percent purity or higher. If necessary, it can be further purified by recrystallization.

The method, as just described, is easy to carry out and permits production of dl-serine in good yields and in readily purifiable condition from starting materials that are available at moderate cost.

The following examples describe ways in which the invention has been practiced, but are not to be construed as limiting its scope.

*Example 1*

To a slurry of 71 grams (1 mole) of crystalline acrylamide in 450 cc. of methanol, 160 grams (1 mole) of bromine was added with stirring in about 10 minutes. During addition of the bromine, the mixture heated spontaneously to the boiling temperature of about 65° C. Thereafter the mixture was boiled under reflux for 2 hours, i. e. until consumption of the bromine was substantially complete. The mixture was cooled to about 20° C. and 360 cc. of a sodium methylate solution, formed by reacting 26.5 grams (1.15 gram atomic weight) of sodium with methanol, was added in 30 minutes. During, and for 3 hours after, addition of the sodium methylate, the mixture was stirred and cooled to maintain it at 20° C. or somewhat lower, i. e. at temperatures in the range of from 0° to 20° C. The resulting mixture was placed in a stainless steel bomb and 340 grams (20 moles) of anhydrous ammonia was added. The bomb was closed and heated, while rotating the same, at temperatures between 90° and 100° C. for 3 hours. The bomb was then cooled, opened to release the pressure, and the charge removed. Half of the reaction mixture was evaporated to dryness under vacuum. To the residual crude alpha-amino-beta-methoxy-propionamide, 576 grams of aqueous hydrochloric acid of approximately 22.2 weight percent concentration was added. The mixture was boiled under reflux for 24 hours and then evaporated under vacuum to dryness. The residual product was dissolved in 400 cc. of methanol and the mixture was filtered to remove undissolved inorganic material (principally ammonium chloride). The filtrate was neutralized to a pH value of from 7 to 8 with an aqueous ammonium hydroxide solution and allowed to stand overnight at room temperature, whereupon dl-serine crystallized therefrom. The product was removed by filtration, dried and weighed. There was obtained 35 grams of a substantially white crystalline product which was found, by analysis, to be dl-serine of 97 percent purity, the impurity being ammonium chloride. The yield of dl-serine was approximately 64.8 percent of theoretical, based on the amount of acrylamide employed as a starting material.

*Example 2*

The procedure for making dl-serine described in Example 1 was repeated, except that instead of using hydrochloric acid for the hydrolysis of the alpha-amino-beta-methoxy-propionamide and boiling the mixture for 24 hours, there was employed 390 cc. of an aqueous hydrobromic acid solution of 48 weight percent concentration and the hydrolysis was accomplished by boiling the mixture under reflux at atmospheric pressure for only 2.5 hours. The yield of dl-serine in this experiment was approximately the same as in Example 1.

*Example 3*

This example illustrates the preparation and isolation of alpha-amino-beta-methoxy-propionamide hydrobromide. One gram mole (71 grams) of acrylamide was brominated. The mixture resulting from the bromination was treated and reacted with sodium methylate, after which anhydrous ammonia was added and the mixture was heated in a bomb to form a crude mixture comprising alpha-amino - beta - methoxy-propionamide. The procedure in carrying out these successive reactions was similar to that described in Example 1. After completing the ammonolysis reaction, the bomb was cooled, opened, and the mixture removed. The mixture was evaporated to dryness under vacuum and the solid residue was mixed with 500 cc. of absolute ethanol heated to nearly the boiling point. The resulting slurry was cooled in a bath of ice water and filtered. As the residue, there was obtained 118 grams of crystalline material containing 79 weight percent of bromine and consisting for the most part of a mixture of sodium bromide and ammonium bromide. The filtrate, which had a volume of 700 cc., was treated with 46 grams of an aqueous 46 percent hydrobromic acid solution and was cooled to, and maintained at, 5° C. for 20 hours. A precipitate thus formed was separated by filtration, washed with absolute ethanol, and dried. It weighed 135 grams and was a light brown solid material. It was dissolved in 150 cc. of hot methanol and the solution was filtered. The filtrate was diluted with 200 cc. of absolute ethanol and cooled in an ice bath to crystallize the product, i. e. alpha-amino-beta-methoxy-propionamide hydrobromide, therefrom. The product was removed by filtration and dried. It weighed 75 grams and was a light yellow crystalline compound having a melting point of 171–172° C. A portion of the product was found by analysis to contain 40.5 percent by weight of bromine. The mother liquor from which the product had been crystallized was evaporated until of 75 cc. volume, and 150 cc. of absolute ethanol was added. The resulting mixture was cooled to crystallize a further amount of product therefrom and the product was separated by filtration and dried. There was thus obtained an additional 30 grams of alpha-amino-beta-methoxy-propionamide hydrobromide. A portion of this further amount of product was analyzed and found to contain 40.3 weight percent of bromine. The theoretical value, for alpha-amino-beta-methoxy-propionamide hydrobromide, is 40.2 percent of bromine.

*Example 4*

A mixture of 10 grams (0.05 mole) of alpha-amino-beta-methoxy-propionamide hydrobromide, 3.2 grams of potassium hydroxide of 85 weight percent purity and 100 cc. of absolute ethanol was warmed to 70° C., then cooled to 20° C. and filtered. As the residue, 5.6 grams of potassium bromide was obtained. A solution of 0.05 gram mole of hydrogen chloride in absolute ethanol was added to the filtrate and the mixture was cooled in an ice bath for 30 minutes, whereby the alpha-amino-beta-methoxy-propionamide hydrochloride product was crystallized therefrom. The product was separated by filtration, washed with absolute alcohol, and dried. There was obtained, 7.1 grams (92 percent of the theoretical yield) of alpha-amino-beta-methoxy-propionamide hydrochloride. The product was recrystallized by dissolving it in 25 cc. of hot methanol, filtering to remove a small amount of insoluble material, diluting the filtrate with 25 cc. of absolute ethanol and cooling the resulting mixture in an ice bath to effect the crystallization. The recrystallized product was separated by filtration, washed with absolute ethanol, and dried. There was obtained 5.1 grams (66 percent of the theoretical yield) of the recrystallized alpha-amino-beta-methoxy-propionamide hydrochloride. It had a melting point of 174–175° C. and was found, by analysis, to contain 23.2 percent by weight of chlorine. The theoretical value for the compound is 23.0 percent of chlorine.

*Example 5*

To a mixture of 4 grams (0.02 mole) of alpha-amino-beta-methoxy-propionamide hydrobromide and 10 cc. of absolute ethanol there was added 15.3 cc. of a 1.3 normal solution of potassium hydroxide in absolute alcohol, whereby the alpha-amino-beta-methoxy-propionamide was released from its salt and potassium bromide precipitated. The mixture was filtered and 2.32 grams of potassium bromide obtained as the residue. Alcohol was evaporated under vacuum from the filtrate to obtain the alpha-amino-beta-methoxy-propionamide as a residue. Upon completion of the evaporation the residual product weighed 2.32 grams. It was a pale, straw-colored, viscous oil having an index of refraction, $n_D^{25}$, of 1.4840. It was hygroscopic. On standing in an open vessel at room temperature for 4 hours, it absorbed approximately 15 percent of its weight of moisture from the air.

We claim:

1. A method which comprises (1) reacting bromine with acrylamide to form alpha,beta-dibromo-propionamide, (2) reacting the alpha,beta-dibromo-propionamide with a metal alkoxide in the presence of more than the stoichiometric amount of the latter at temperatures which, toward the end of the reaction, are between 0° and 40° C. whereby an alpha-bromo-beta-alkoxy-propionamide is formed, (3) reacting the latter with ammonia to form an alpha-amino-beta-alkoxy-propionamide, and (4) hydrolyzing the alpha-amino-beta-alkoxy-propionamide by heating the same together with an aqueous solution of at least one acid selected from the class consisting of hydrochloric acid and hydrobromic acid.

2. In a method for making a compound of the group consisting of dl-serine and its hydrochloride and hydrobromide, wherein bromine is reacted with acrylamide to form alpha,beta-dibromo-propionamide, the steps of mixing more than one molecular equivalent of an alkali metal alkoxide with a solution of one molecular equivalent of the alpha,beta-dibromo-propionamide in a saturated lower aliphatic alcohol and maintaining the mixture at temperatures between 10° and 30° C. until the alpha,beta-dibromo-propionamide is substantially reacted to form an alpha-bromo-beta-alkoxy-propionamide, treating the mixture with at least 5 molecular equivalents of ammonia and heating it to a reaction temperature at superatmospheric pressure, whereby an alpha-amino-beta-alkoxypropionamide is formed, and hydrolyzing the latter by heating it together with an aqueous solution of at least one acid selected from the class consisting of hydrochloric acid and hydrobromic acid.

3. A method, as claimed in claim 2, wherein the alkali metal alkoxide is sodium methoxide, the alpha-bromo-beta-alkoxy-propionamide is alpha-bromo-beta-methoxy-propionamide, and the alpha-amino-beta-alkoxy-propionamide is alpha-amino-beta-methoxy-propionamide.

4. A method for making dl-serine which comprises reacting one molecular equivalent of acrylamide with approximately one molecular equivalent of bromine in the presence of a lower aliphatic alcohol as a reaction medium, thereafter bringing the mixture to a temperature between 10° and 30° C. and adding more than one molecular equivent of an alkali metal alkoxide, maintaining the mixture at temperatures between 10° and 30° C. until the reaction which takes place is substantially complete, adding at least five molecular equivalents of substantially anhydrous ammonia, heating the mixture to a reaction temperature between 80° and 150° C. at a superatmospheric pressure sufficient to maintain at least a portion of the mixture in liquid condition, evaporating the mixture to obtain a solid residue comprising an alpha-amino-beta-alkoxy-propionamide, admixing the residue with an aqueous solution containing at least three molecular equivalents of a hydrohalic acid consisting essentially of at least one acid selected from the class consisting of hydrochloric acid and hydrobromic acid, boiling the mixture under reflux to hydrolyze the alpha-amino-beta-alkoxy-propionamide and form a dl-serine hydrohalide, evaporating the mixture to obtain a solid residue comprising the dl-serine hydrohalide, dissolving the latter in a lower aliphatic alcohol and removing any undissolved solids from the solution, neutralizing the solution by treatment with an aqueous ammonium hydroxide solution, crystallizing dl-serine from the solution, and separating the crystalline dl-serine.

5. A method, as claimed in claim 4, wherein the alkali metal alkoxide is sodium methoxide, the alpha-amino-beta-alkoxy-propionamide is alpha-amino-beta-methoxy-propionamide, and the alcohol in which the dl-serine hydrohalide is dissolved is methanol.

References Cited in the file of this patent
UNITED STATES PATENTS 2,571,755    Pfister et al. _____ Oct. 16, 1951

OTHER REFERENCES

Schiltz et al.: J. Biol. Chem., vol. 116, pp. 793–7 (1936).
Wood et al.: J. Biol. Chem., vol. 134, pp. 413–416.
Block: Chemical Rev., vol. 38, No. 3, 1946, pp. 514–16.
Rothstein: Chem. Soc. Journal (London), 1949, Part 111, pp. 1968–1972.